United States Patent
Bain et al.

(10) Patent No.: US 9,578,070 B2
(45) Date of Patent: Feb. 21, 2017

(54) METHOD FOR INSERTING BACKGROUND AUDIO INTO VOICE/VIDEO CALL

(71) Applicant: Cellco Partnership, Basking Ridge, NJ (US)

(72) Inventors: Alice Yuan Bain, Morristown, NJ (US); William Andrew Fish, Bedminster, NJ (US); Andrew Wahlon Lam, River Edge, NJ (US)

(73) Assignee: Cellco Partnersip, Basking Ridge, NJ (US)

( * ) Notice: Subject to any disclaimer, the term of this patent is extended or adjusted under 35 U.S.C. 154(b) by 180 days.

(21) Appl. No.: 14/333,679

(22) Filed: Jul. 17, 2014

(65) Prior Publication Data

US 2016/0021151 A1  Jan. 21, 2016

(51) Int. Cl.
  *H04L 29/06* (2006.01)

(52) U.S. Cl.
  CPC ....... *H04L 65/1089* (2013.01); *H04L 65/1006* (2013.01); *H04L 65/1016* (2013.01); *H04L 65/605* (2013.01)

(58) Field of Classification Search
  CPC ............ H04L 65/1006; H04L 65/1016; H04L 65/1089; H04L 65/605; H04M 3/42–3/42187; H04M 3/42229; H04M 3/42348–3/42374; H04M 3/4285; H04M 3/487–3/4938; H04M 3/56–3/569; H04M 2201/50; H04M 2203/10; H04M 2203/20; H04M 2203/2011; H04M 2203/35–2203/352; H04M 2203/50–2203/509; H04M 2203/65; H04M 2203/651; H04M 2203/654; H04M 2203/655

USPC .................. 348/14.01–14.16; 370/259–271, 370/351–357; 379/67.1–88.28, 379/93.01–93.04, 101.01, 142.1, 201.01, 379/202.01–207.01; 455/412.1–426.2, 455/456.1–466, 550.1–567, 90.1–90.3; 709/201–207, 217–248

See application file for complete search history.

(56) References Cited

U.S. PATENT DOCUMENTS

| | | | | |
|---|---|---|---|---|
| 6,407,325 B2* | 6/2002 | Yi | ........................ | G10H 1/0041 84/600 |
| 6,683,938 B1* | 1/2004 | Henderson | ............ | H04M 3/487 379/101.01 |
| 7,436,786 B2* | 10/2008 | Ban | ...................... | G10L 19/012 370/201 |
| 7,668,714 B1* | 2/2010 | Croak | ................... | G10L 19/012 704/210 |
| 7,774,009 B2* | 8/2010 | Choi | ................... | H04L 12/5895 455/414.1 |
| 7,920,565 B2* | 4/2011 | Brocke | ................ | H04N 21/235 370/389 |
| 8,630,283 B1* | 1/2014 | Breau | ................ | H04L 12/6418 370/329 |

(Continued)

*Primary Examiner* — Hemant Patel (57) ABSTRACT

A background noise inserter server is described that includes a communication interface for communicating with a network, memory for storing background audio, and a processor coupled to the communication interface and the memory. The processor controls the server to connect to a phone call session in response to a session initiation protocol (SIP) invite from a calling device indicating that the calling device is requesting the background audio in the phone call session with a called device. The processor also controls the server to insert the background audio into the phone call session so that the inserted background audio is mixed with audio from the phone call session transmitted to both the calling device and the called device.

20 Claims, 6 Drawing Sheets

(56) References Cited

U.S. PATENT DOCUMENTS

| | | | |
|---|---|---|---|
| 8,817,639 B2* | 8/2014 | Kee | H04B 1/1027 370/252 |
| 2005/0101262 A1* | 5/2005 | Lee | H04M 3/42348 455/76 |
| 2009/0285402 A1* | 11/2009 | Goldman | H04K 1/02 380/287 |
| 2010/0239078 A1* | 9/2010 | Sweeney | H04L 65/1089 379/101.01 |

* cited by examiner

Background Noise File

User A

Credentials
   1) Identification
   2) Service Plan Information Noise Selections
   1) Noise 1
   2) Noise 2
   3) Noise 3
   .
   .
   N) Noise N Automatic Noise Preferences
   1) Noise 1 @ Location A
   2) Noise 2 @ Location B
   3) Noise 3 During Daytime
   .
   .
   N) Noise N For Called Party X

FIG. 6

METHOD FOR INSERTING BACKGROUND AUDIO INTO VOICE/VIDEO CALL

BACKGROUND

In recent years, mobile phones (e.g., Smartphones) have been heavily relied upon to perform phone calls and video conferencing. With this increased popularity has come an increased demand for privacy and comfort while conducting a phone call or video conference call.

Specifically, when conducting a phone/video call, the calling or called party may be in a location that may be noisy or otherwise distracting/uncomfortable due to background audio or lack of background of audio. The receiver of conventional mobile devices may pick up this unwanted background audio or may not pick up any background audio in a quiet environment which may make it difficult or annoying to conduct a video/phone call. Unwanted background audio may also tip the called party to the calling party's location (or vice versa), which may not be desirable. Currently there does not exist a system that allows a calling/called party to insert desirable background audio into a phone call and/or filter out undesirable background audio.

BRIEF DESCRIPTION OF THE DRAWINGS

The figures depict one or more implementations in accordance with the present teachings, by way of example only, but not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of relevant teachings. However, it should be apparent that the present teachings may be practiced without such detail. In other instances, well-known methods, procedures, components and/or circuitry have been described at a relatively high level, without detail, in order to avoid unnecessarily obscuring aspects of the present teachings.

A need exists to provide a mechanism in a digital communication network, and in particular an IP multi-media subsystem (IMS) network, that allows a user of a mobile device to insert background audio into a phone/video call. From herein, background audio and background noise will be used interchangeably to refer to audio data that is inserted into a phone/video call so that it is mixed with the voices of the called party and calling party. This mixed audio is perceived by both the called and calling party as background audio similar to background audio that is normally picked up through a receiver of a phone (i.e. sounds of the environment in which the called/calling party are located). For instance, in some scenarios, background audio may seem to a listener to be lower in volume and/or less intelligible than speech of a caller or a called party who is speaking. Insertion of the background audio may be performed for privacy reasons or for entertainment purposes. Furthermore, the insertion of the background audio may be started at the beginning of the phone/video call or sometime during the phone/video call (i.e. after the beginning of the call).

In general, IMS is an architecture providing services to mobile users based on internet protocols. IMS allows mobile end users to conduct multimedia sessions such as video/phone calls. In an IMS system, session initiation protocol (SIP) is utilized as a signaling protocol to control the traffic flow of data through the network. SIP enables multiple end users to communicate in established sessions between each other and various other network devices.

Figure 1:
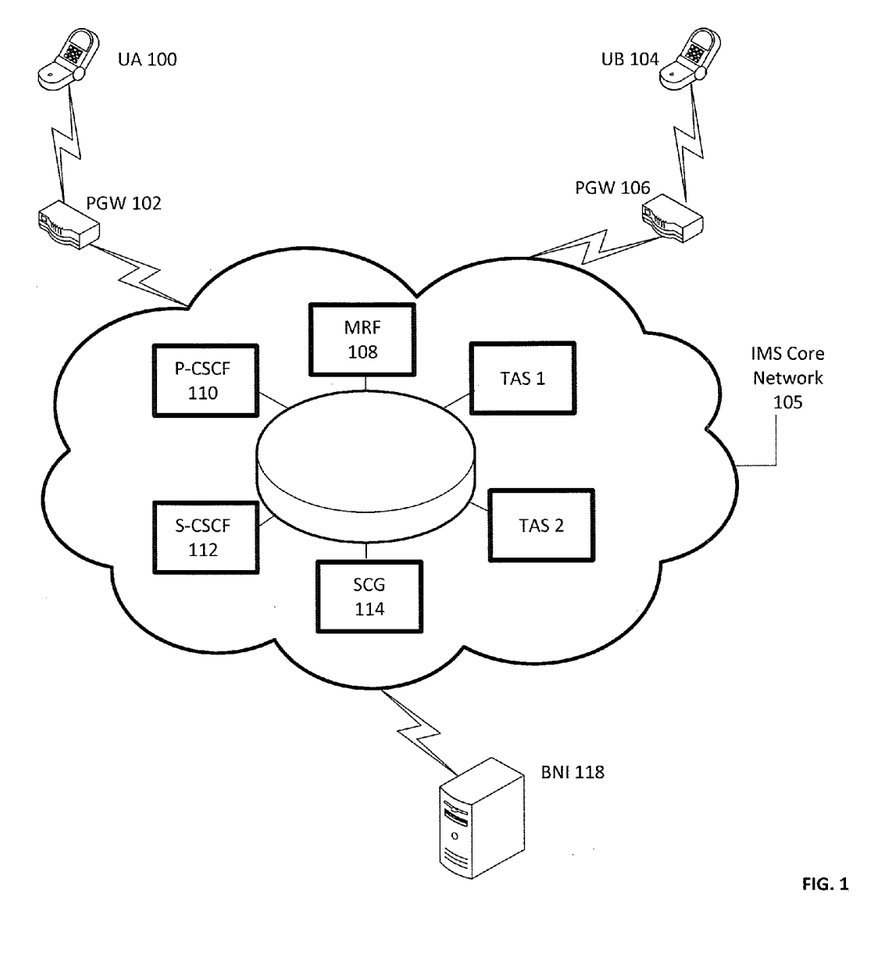
FIG. 1 shows a block diagram of mobile devices and network elements in an IMS network.

The illustrated system services any number of mobile user devices, two examples of which 100, 104 are shown in FIG. 1 for purposes of this discussion. Mobile devices may be laptops, a personal digital assistants ("PDAs"), smartphones, tablet PCs, portable games or media players with wireless communication elements, or other portable devices designed to communicate via one or more wireless networks. Although not shown, other non-mobile devices (e.g. corded phones, desktop PCs, etc.) may also utilize the background audio insertion system described below when conducting voice over IP phone/video calls. Since our discussion focuses on calls involving background audio insertion, we will discuss smartphone devices for two users, specifically UA 100 and UB 104, and will use smartphones as examples of such devices. Each of those mobile device examples 100, 104 have wireless network communication capability, user interface hardware and one or more physical elements for providing audio output to and received audio input from a respective user interface. Internally, such devices typically include one or more wireless transceivers for data communication, a processor configured/connected to control device operation, a memory and programming. Although not shown, there may be many other mobile devices.

The illustrated system example in FIG. 1 includes an IMS core network 105 and one more mobile communication access networks (not shown), in this case, operated in accordance with 4G LTE (fourth-generation, long term evolution) standards, although other wireless networks at least supporting data communications may be used for voice or video call traffic and other packet data communications. Additional networking is represented in the drawing generally by lightning bolts. For example packet gateways (PGWs) are connected for IP packet data communication with the IMS core network 105. Although they may communicate via the same network and PGW, in the example, each mobile device communicates through a respective wireless access network with a respective PGW. The wireless access networks provide the 4G LTE communication over the air for the mobile devices.

The IMS core network 105 includes a number of call session control function (CSCF) platforms, two of which are shown for purposes of discussion of examples of communication sessions that may involve background audio insertion. CSCF platforms process SIP signaling messages and perform session-related control, e.g. to set-up or tear-down session. In our example, the IMS core network 105 may include, among other elements, a proxy call session control function (P-CSCF) device 110, a serving call session control function (S-CSCF) device 112. In the example, the IMS core network 105 also includes a media resource function server (MRF) 108 a service continuity gateway (SCG) 114, telephony application servers (TAS1 and TAS2). Other elements in FIG. 1 include PGW 102, PGW 106, UA 100 and UA104.

In general, PGW 102 provides an interface between an LTE network (not shown) utilized by UA 100 and the IMS core network 105 shown in FIG. 1. Similarly, PGW 106 provides interface between an LTE network (not shown) of UB 104 and the IMS network shown in FIG. 1. P-CSCF 110 acts as a SIP proxy server for the IMS core network 105. S-CSCF 112 acts as a point of control in the network to control the sessions between the mobile devices. TAS1 and TAS2 provide telephony applications to be executed by the IMS network for the respective mobile devices to which they are servicing, e.g. to control voice or video call set-up to and from the respective mobile devices. SCG 114 provides service continuity across different access technologies and communication to the S-CSCF. MRF 108 provides media manipulation such as playing of tones/announcements, and therefore provides the ability to insert audio into the phone/video call in an ON-Demand manner. Some examples of background audio insertion utilize the audio generation/addition capabilities of the MRF 108 to mix the background audio with the call session audio.

The IMS core network 105 and the access networks can provide a variety of multimedia communication services. For communications that may involve background audio insertion, we will focus discussion here on real time call sessions, such as for voice calls or video over LTE (VoLTE) calls. For example, end user device UA 100 (i.e., calling party) may want to make a phone/video call to end user device UB 104 (i.e., called party). In general, as shown in FIG. 1, UA 100 and UB 104 may communicate through respective radio access networks (not shown) and PGWs 102 and 106.

In general, all devices in the IMS core network 105 may be connected to each other via wired or wireless connections so that packet based communication is possible between all of the various devices. It should be noted that although FIG. 1 shows that both UA 100 and UB 104 are connected to the same IMS core network 105, these mobile devices may also be connected to different IMS core network 105s. Showing the connection to a single IMS core network 105 is done for simplicity of explanation. In an example where there are two IMS core network 105s, each IMS core network 105 for each of the mobile devices may include the various devices that are shown in FIG. 1, and these networks may communicate with each other (i.e., communication between the two different IMS core networks may occur). In either case, the IMS core network(s) is able to set up the phone/video call between UA 100 and UB 104.

Referring back to FIG. 1, the IMS core network 105 may also communicate with a background noise inserter (BNI) 118, which is an additional device that may or may not be located within the IMS core network 105. BNI 118 is essentially a network connected computer platform programmed or otherwise configured as a server that provides background audio data for insertion into digital media streams such as voice or video call sessions. The BNI 118 in the example is able to insert background audio into phone/video call streams itself or provide the background audio to the MRF 108 of the IMS core network 105 for insertion into the media streams for at least some call sessions. In any event, the called or calling party may communicate with BNI 118 through the IMS core network 105 in order to trigger background audio insertion into the phone/video call. The BNI 105 may insert the audio at the beginning of the call based on default information, e.g. in response to a connection of a call for a party having default insertion service to the BNI 105; or the BNI 105 may transmit requested audio to the MRF 108 during the phone call so that the MRF 108 can insert the background audio.

It is noted that although FIG. 1 shows a specific IMS core network 105 with specific devices, that in different examples, different hardware devices may or may not be included within each network. It is also understood that although UA 100 and UB 104 are shown as mobile devices, these may include any devices capable of network communications. For example, they may include corded, cordless telephones, cell phone, Smartphone, laptop computer, tablet computer, desktop computer or any other computing or communication device that is capable of making a phone/video call over packet communication facilities coupled to the IMS core network 105. Each of these user devices may also have separate phone and/or IP numbers that are used to connect the respective user devices to one or more networks which may have different access technologies.

The IMS core network 105 shown in FIG. 1 may include any type of network or combination of networks such as LAN, WLAN, WAN, WWAN, etc. The IMS network may be capable of providing a variety of communication network services, such as registration services, authentication services, authorization services, call session control services and other types of communication services. Specifically, these networks may be configured to include IMS networks as shown in FIG. 1.

It should be noted that the various devices shown in FIG. 1 may include one or more computing and/or storage devices. These devices may include a computer, memory, a server, a cluster of servers or one or more of other types of computing or communication devices.

Figure 2:
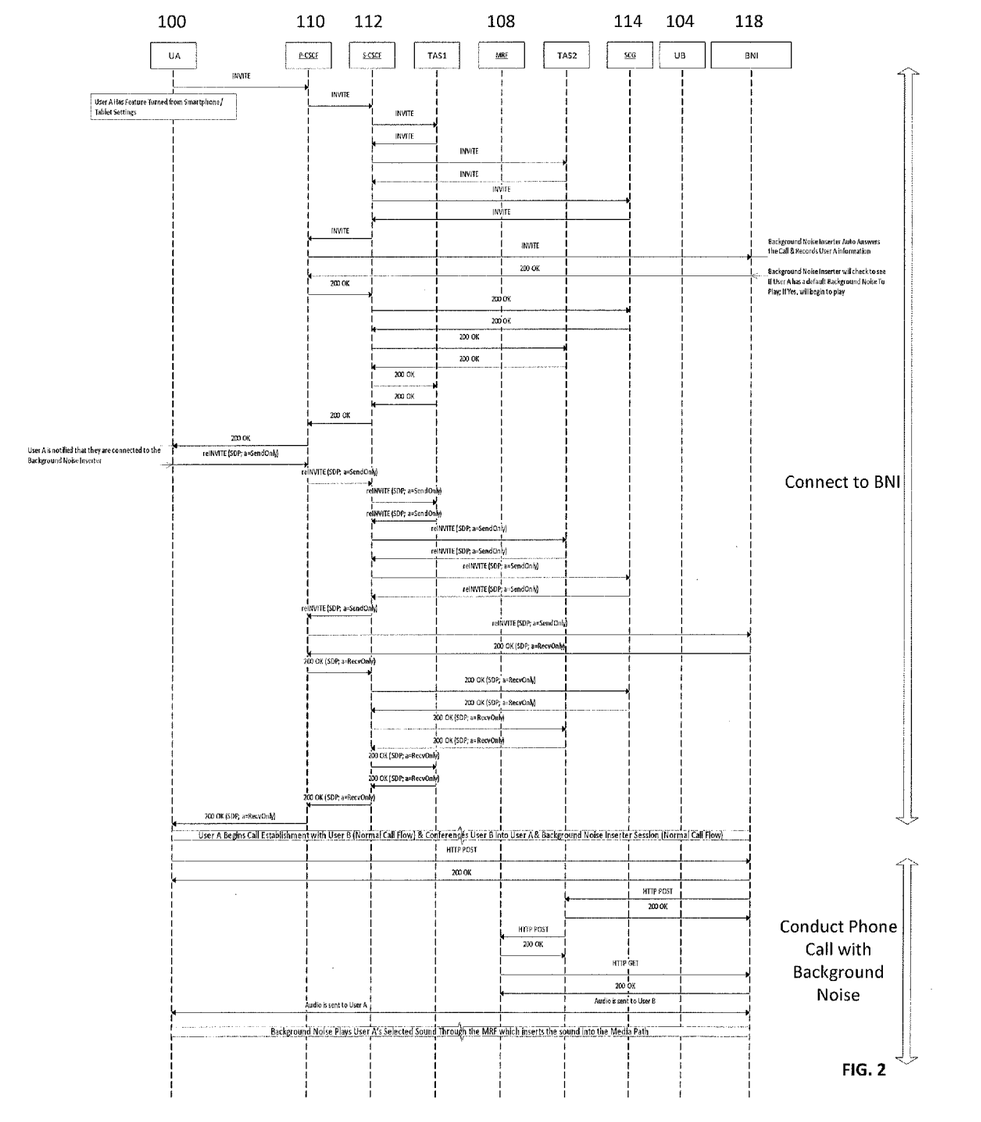
FIG. 2 shows a flow chart for a calling party to connect to a background noise inserter (BNI) in the system of FIG. 1 and conduct a phone call with inserted background audio.

An example of an overall process of performing a phone/video call with background audio being inserted is shown in FIG. 2. In the upper section of the flow chart of FIG. 2 (at the beginning of establishing the phone call when UA 100 dials UB 104), the calling device UA 100 may include an application for inserting background audio into the phone call. The user of UA 100 may decide to call UB 104. Upon dialing the phone number of UB 104, the application on UA 100 first connects UA 100 to BNI 118. Once UA 100 is connected to BNI 118 the application allows the normal call establishment between UA 100 and UB 104. Once the call is established, the lower section of the flow chart of FIG. 2 (during the established phone call) shows that the call is performed between UA 100 and UB 104 with the background audio being inserted into the phone call in an ON-Demand manner by the MRF 108. Insertion can be performed by the BNI 118 at the beginning of the phone call (e.g. as soon as BNI 118 is conferenced in on the call with UA 100), and/or may be performed by the MRF 108 once the phone call has already been established. Such insertions may be dictated by settings in the background noise file of FIG. 5 that is accessible by BNI 118 and/or MRF 108. For example, the BNI 118 may insert default audio into the beginning of the phone call or after a predetermined amount of time based on default audio options (i.e. type of audio, start time of audio, etc.) being indicated in the background noise file of the calling party and/or called party. In another scenario, the BNI 118 does not contain default audio, the BNI instead connects to UA 100 but does not insert any audio. In either scenario, after the call is already established, the BNI 118 may receive a request from UA 100 to play specific background audio. The request may be triggered by the calling party and/or called party by pushing a button (not shown) on their respective phones. For example, the user of UA 100 may be presented with a list of possible background audio files to be inserted. The user of UA 100 may then select a preferred audio by pressing a button on the phone. This selection generates the request to the BNI. The BNI 118 then transmits this requested audio to the MRF 108 where it is then inserted by the MRF 108.

In other examples, the default audio may also be selected based on various factors. Some of these factors include, but are not limited to identity of the call participants (e.g. called or calling party), call initiation time, and location of the call participants. In one example, the calling device and/or called device may detect these factors and submit an audio insertion request to the BNI when one or more of these factors are satisfied. In other examples, the BNI and/or MRF may detect these factors based on settings in the background noise file of FIG. 5.

Figure 5:
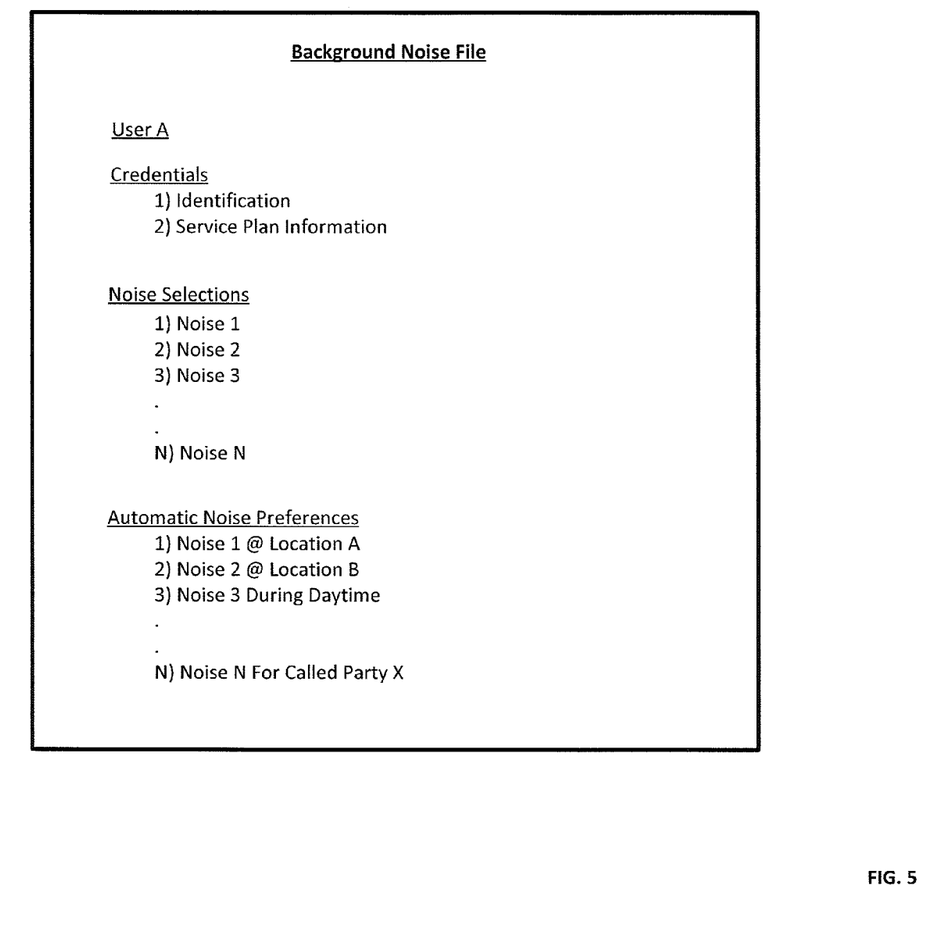
FIG. 5 shows a background noise file showing information of preferences of a user regarding background audio.

For instance, the background noise file may have entries indicating that UA prefers default background audio (e.g. professional sounding audio) to be inserted when calling an identified client. In another example, the default audio may be inserted based on the location (e.g. out of the office) of UA 100, time of week (e.g. weekend), time of day (e.g. night time), etc., regardless of the identity of the called party.

As described above, the upper section the flow chart of FIG. 2 is where UA 100 connects to BNI 118. An invite message is sent from UA 100 to P-CSCF 110. The invite message is then forwarded from P-CSCF 110 to S-CSCF 112 and then to TAS1 which is servicing UA 100. The invite is then sent back to S-CSCF 112 and then forwarded to TAS2 which is servicing UB 104 and BNI 118. The invite is then sent back from TAS2 to S-CSCF 112, and then forwarded to the SCG 114 where it is sent back to the S-CSCF 112. The invite is then sent from the S-CSCF 112 to the P-CSCF 110 and then eventually to the BNI 118. It should be noted that TAS2 is assigned to BNI 118 in this example. In other examples TAS2 may be assigned to multiple BNIs (not shown), or each of the multiple BNIs (not shown) may be assigned to multiple different TASs (not shown). When TAS2 is assigned to multiple BNIs, TAS2 handles the various invite and reinvite messages on behalf of each BNI and their respective calling/called devices. TAS2 routes the various messages for each BNI during the conferencing of the called/calling devices with the BNI and/or MRF, as well as the background noise insertion for multiple phone calls. When multiple BNIs are serviced by different TASs, each BNI has a dedicated TAS for routing the invite and reinvite messages during the conferencing of the calling/called parties and during the background noise insertion. In either case, the user device connects to a BNI through a TAS that is assigned to the BNI 118.

This SIP invite received by the BNI 118 may include the identification information of UA 100. This allows the BNI 118 to determine if UA 100 is authorized to utilize the BNI 118 services. It should be noted that to be authorized for the BNI 118 service and select default and particular background audio, the user of UA 100 registered in advance with the service provider of the BNI 118 service. As part of the registration process, the user of UA 100 provides identification information as well as perhaps financial information (e.g. credit card number) to the service provider to access the BNI 118 services. The BNI 118 services may also be added to the user's monthly bill if the user is a monthly subscriber of the service provider.

Returning to the process flow example of FIG. 2, if UA 100 is authorized, BNI 118 also looks to determine if UA 100 has a default background noise to play. If the default background noise is known to the BNI 118 through a background noise file (see FIG. 5), then the BNI 118 begins to play this noise at the beginning of the phone call (i.e., the UA 100 will begin to hear the background noise/audio). It should be noted that when the user of UA 100 signs up for the BNI service, the user may download a BNI application onto UA 100. The BNI application allows the user of UA 100 to select specific audio preferences and default audio settings to be used as background noise during phone/video calls.

In any event, once UA 100 is authorized, BNI 118 sends an OK message to the P-CSCF 110, which will then be forwarded to the S-CSCF 112. The OK message is forwarded to the SCG 114 and then back to the S-CSCF 112. This OK message is forwarded to the TAS2 and then back to the S-CSCF 112. Finally, the OK message is forwarded to the TAS1, to the S-CSCF 112, to the P-CSCF 110 and then finally back to UA 100. Once UA 100 receives this OK message, UA 100 knows that it is connected to the BNI 118.

Similar to the invite messages, re-invite messages may also be passed between the various devices to conference in UB 104. In one example, this conference call bridge between UA 100 and UB 104 occurs through MRF 108. It should be noted that the reInvite messages creating a conference call between UA 100, BNI 118 and UB 104. In either case, once the UA 100 is connected to BNI 118, UA 100 begins the normal call flow to connect to UB 104. Although not shown, an invite message may be forwarded by UA 100 to UB 104 to initiate the phone/video call. When initiating the phone/audio call, UA 100 may send an instruction to PGW 102. PGW 102 then sends the SIP invite message to the P-CSCF 110 where it is eventually then forwarded through the S-CSCF 112, the TAS1, the TAS2, SCG 114 and eventually to UB 104. In any event, after the invite is received by UB 104, OK messages are sent back from UB 104 to UA 100.

Once UA 100 is connected to BNI 118, UA 100 begins call establishment with UB 104 (see FIG. 2 after the connection to the BNI). The detailed process of establishing a phone call from UA 100 to UB 104 is not shown because the establishment process is somewhat similar to the invite and OK messages that are sent between UA 100 and BNI 118 when UA 100 is attempting to connect to BNI 118. Thus, the end result is that the phone/video call is established between UA 100, UB 104 and BNI 118 so that the background audio will be heard by both UA 100 and UB 104 (see FIG. 2 after the connection to the BNI).

During normal operation, we will assume that BNI 118 starts playing a default background audio in the phone call at set-up. In one example, the BNI 118 receives the media stream from both UA 100 and UB 104. The BNI 118 digitally mixes the media stream containing the voice of the user for UA 100 with the default background audio that is known and digitally mix the media stream containing the voice of the user for UB 104 with the default background audio that is known. After insertion, the modified media streams is sent to both UA 100 and UB 104 where the respective mobile device users will hear this background audio along with each other's respective voices. Essentially, the BNI 118 acts as a middle-man device that receives the media streams of the phone call, inserts the background audio into the media streams and then delivers the media streams to UA 100 and UB 104.

In the example to this point, the method involves a connection to the BNI 118, which is performed the background audio insertion via a conference bridging function, based on a default audio selection set-up in advance for the user of UA 100. However, assuming that UA 100 did not have a set default background audio in BNI 118, UA 100 may request a background audio after the phone call has already been established (i.e., an ON-Demand request).

This ON-Demand request scenario is shown as the last phase in FIG. 2 after the initial connection to the BNI and the call to UB 104 has already been established. It should be noted that the ON-Demand request can be made regardless if default audio is playing during the phone call or not. For example, if default background audio is not playing during the phone call, then the On-Demand request will establish specific background audio selected by the user into the phone call. In another example, if default background audio is already playing due to BNI insertion, the On-Demand requested background audio may override the default background audio in the middle of the phone call.

In order to perform the ON-Demand request, UA 100 may send a HTTP post message to BNI 118. The HTTP post message may essentially be a message generated by UA 100 based on an audio selection by the user. For example, the user of UA 100 may decide during a phone call with UB 104 that specific background audio should be inserted into the phone/video call. UA 100 may display a list of background audio selections that may be selected by the user. The user of UA 100 may then select a particular background audio that seems desirable. A selection is then sent to BNI 118 via the HTTP post. If BNI 118 receives the HTTP post successfully, and is able to play the requested background audio, an OK message is sent back to UA 100. BNI 118 then sends an HTTP post to TAS2 (i.e. the TAS assigned to BNI 118) and receives an OK message in response. The HTTP post with the background audio is then sent from TAS2 to the MRF 108 telling MRF 108 which call session to join for the duration of the sound to be played. MRF 108 then sends an OK message back to TAS2. The MRF then sends a HTTP get message back to background noise inserter. This HTTP get message is essentially a request for the background audio selected by the user of UA 100 be sent from BNI 118 to the MRF 108. The requested background audio is then sent to the MRF and an OK message is sent back from BNI 118 to the MRF 108.

In this scenario, once the MRF 108 receives the background audio from BNI 118, the MRF 108 begins playing the selected background audio. Similar to the BNI 118, the MRF 108 receives the media stream between UA 100 and UB 104. The MRF 108 then inserts the received background audio into the media streams and sends the modified media streams to UA 100 and UB 104. In this example, both users of UA 100 and UB 104 then begin to hear the background audio selected by UA 100 since the MRF 108 inserts the background audio into the media paths of the phone/video call. During this process, the BNI 118 is still conferenced into the phone call, but is not inserting any audio itself.

Thus, as described above, the BNI 118 may actually insert a default background audio into the phone call when the phone call session is established. In addition or as an alternative to this default audio insertion, the MRF 108 may insert background audio after the call has been established, in an ON-Demand manner. In one example, this ON-Demand selection of audio overrides or replays the default audio if the default audio is playing. In a second example, this ON-Demand audio may be the first audio played in the background if the default audio is not playing. Essentially, this configuration allows UA 100 to set a default background audio and/or select specific background audio ON-Demand after the call has already been established. In any case, the background audio will played and heard by both UA 100 and UB 104.

It should also be noted that although the examples describe UA 100 selecting the background audio, that the background audio can be selected by UB 104 (i.e. the background audio can be selected by the called party, calling party, or both parties). For example, UA 100 may select a first audio for UB 104 to hear, whereas UB 100 may select a second audio for UA 100 to hear. Essentially each mobile user has their own distinct background audio inserted into the phone call.

In another example, UA 100 and/or UB 104 may have the ability to override the background audio during the call. For example, priority may be assigned to one of the called party and the calling party (i.e. one party may have priority over the other). This priority information may be set in the background noise file of FIG. 5, and may be stored in the BNI, MRF or some other server (not shown) accessible by the BNI and/or MRF.

In one example, if the called party has priority, the called party may push an override button (not shown) on their phone to eliminate the background audio being played. In another example, if the calling party has priority, then the calling party may push the override button (not shown) on their phone to eliminate the background audio being played. As a default, the party that is responsible for inserting the background audio into the phone call may have the priority to eliminate the background audio during the call.

Figure 3:
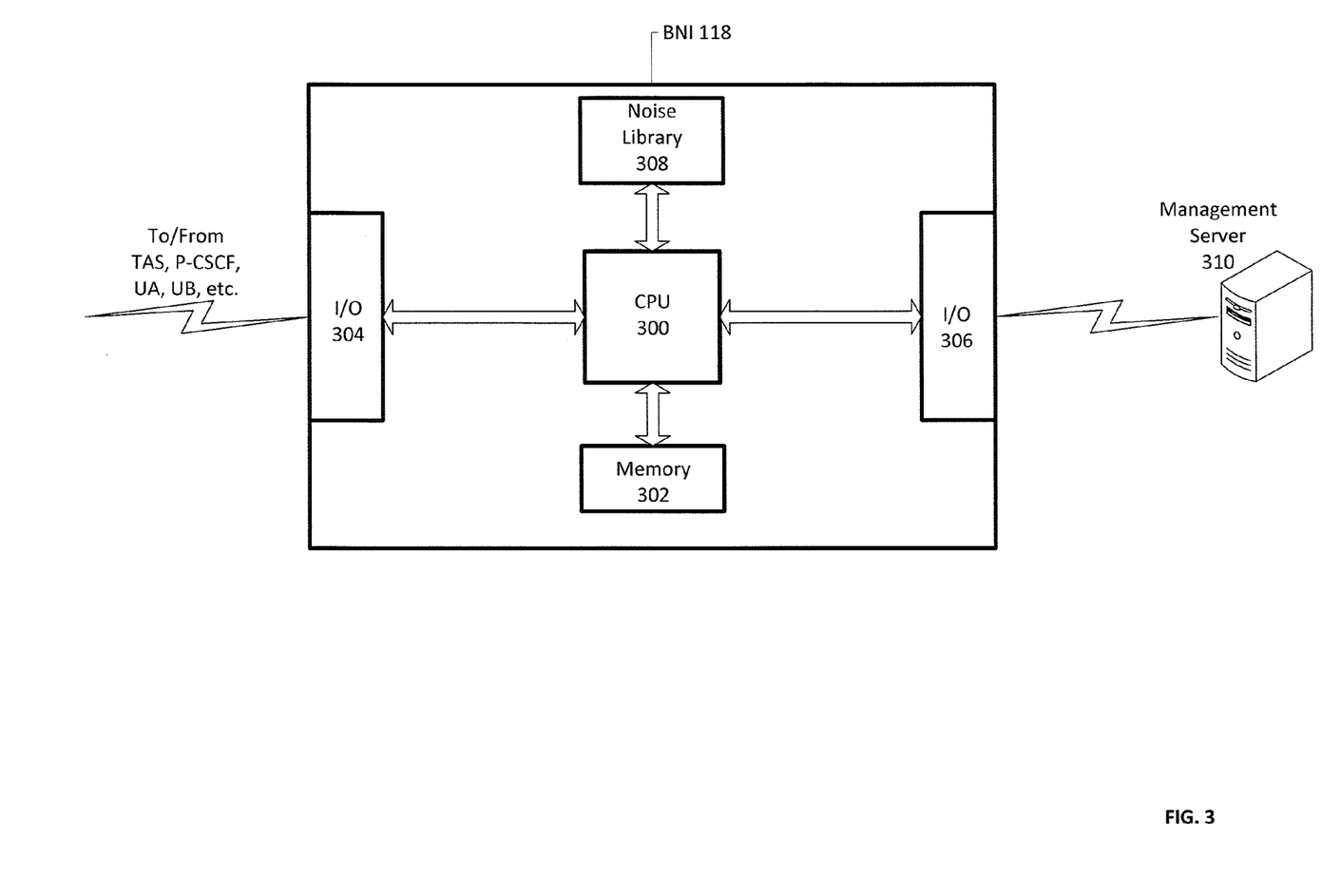
FIG. 3 shows a block diagram of the BNI which communicates with the IMS network and a management server.

Shown in FIG. 3 is block diagram of BNI 118. BNI 118 may include input/output (i.e., I/O) interfaces 304 and 306. BNI 118 may also include CPU 300, memory 302 and noise generator/library 308. It is contemplated that BNI 118 may include more components in different examples.

In general I/O 304 allows the BNI to communicate to the TAS, MRF, UA, UB, etc. as shown in the communication chart of FIG. 2. I/O 306 is an optional interface for allowing the BNI 118 to communicate with an optional management server 310. During normal operation, BNI 118 may communicate with the TAS, MRF, UA, UB, etc. by communicating the various Invite/OK messages shown in the flow chart of FIG. 2. For example, in the upper section of the flow chart of FIG. 2, when UA 100 is attempting to connect to the BNI, CPU 300 may select the default background audio from noise library 308 and insert this default background audio into the phone/video call between UA 100 and UB 104. It should be noted that noise library 308 may be a memory that includes files of various background audios that have already been stored on BNI 118. It is also noted that in another example, the noise library 308 may include an active noise generator that is able to generate background audio in real time that may not be pre-stored.

As mentioned above, CPU 300 inserts the background audio into the phone/video call between UA 100 and UB 104. This insertion in this media path is essentially performed by mixing background audio retrieved from the noise library 308 into the audio into the phone/video call between UA 100 and UB 104. Since the audio between UA 100 and UB 104 is in digital form, the CPU 300 may perform a digital mixing algorithm to insert the background audio into the audio of the phone call so that the background audio does not interfere with the audio of the phone call but rather is heard as background audio. In one example, this insertion may be performed by including the background audio as another source in a conference call (i.e. UA 100, UB 104 and the BNI or MRF that is inserting the background audio are all conferenced on the same call). Alternatively, or in addition to mixing the background audio into the phone call, CPU 300 may also filter the actual background audio in the phone call so that it does not interfere with the selected background audio. For example, if UA 100 is located in a public park, but UA 100 wants UB 104 to think he is located in an office building, then UA 100 selects audio of an office building (e.g. sounds of phones, printers, etc.). The sounds of the park (e.g. kids playing and yelling) may be filtered out of the phone call audio, and sounds of the office building may then be mixed into the phone call audio. Alternatively, the office building audio does not have to be mixed in. The BNI 118 can simply filter the park audio so that UB 104 does not hear any background noise/audio.

It should be noted that the background audio/noise can be any type of audio (music, talking voices, etc.) or any type of noise (e.g. static, sound effects, etc.) The background audio/noise could be audio/noise provided and pre-stored by a service provider, or could be audio/noise generated by UA 100 or UB 104. It should also be noted that although the examples describe UA 100 selecting the background audio, that the background audio can be selected by UB 104 (i.e. the background audio can be selected by the called party, calling party, or both parties). For example, UA 100 may select an office building background for UB 104 to hear, whereas UB 100 may select music audio for UA 100 to hear.

The management server 310 shown in FIG. 3 is an additional optional device that may essentially be utilized (e.g. by the service provider) to manage BNI 118. For example, a service provider may own and operate management server 310. The service provider may then be able to update BNI 118 with information regarding user devices that are authorized to take advantage of the background audio service provided by BNI 118. A management server 310 may also send new and improved background audio files to BNI 118 which may then be stored in noise library 308. Essentially, management server 310 provides a mechanism for controlling and updating (i.e., managing) the function of BNI 118.

Figure 4A:
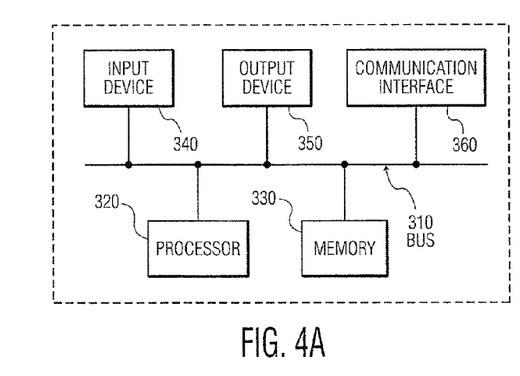
FIG. 4A shows a block diagram of the network device that may be used as any one of the devices shown in FIG. 1.

FIG. 4A is a diagram of example component of a device that may operate within the environment shown in FIG. 1. The device may correspond to user devices or the other network devices such as the MRF, TAS 1, TAS 2, SCG 114, S-CSCF 112, P-CSCF 110, PGW 102, PGW 106 and BNI 118. Each of these devices may include one or more of the elements shown in FIG. 4A.

As shown in FIG. 4A, device 300 may include bus 310, processor 320, memory 330, input device 340, output device 350, and communication interface 360. However, in other implementations, device 300 may include fewer components, additional components, different components, or differently arranged components than those illustrated in FIG. 3.

Bus 310 may include one or more component subsystems and/or communication paths to enable communications among the components of device 300. Processor 320 may include one or more processors, microprocessors, data processors, co-processors, network processors, application-specific integrated circuits (ASICs), controllers, programmable logic devices (PLDs), chipsets, field-programmable gate arrays (FPGAs), or other types of components that may interpret or execute instructions or data. Processor 320 may control the overall operation, or a portion thereof, of device 300, based on, for example, an operating system and/or various applications. Processor 320 may access instructions from memory 330, from other components of device 300, or from a source external to device 300 (e.g., a network or another device).

Memory 330 may include memory and/or secondary storage. For example, memory 330 may include random access memory (RAM), dynamic RAM (DRAM), read-only memory (ROM), programmable ROM (PROM), flash memory, or some other type of memory. Memory 330 may include a hard disk (e.g., a magnetic disk, an optical disk, a magneto-optic disk, a solid state disk, etc.) or some other type of computer-readable medium, along with a corresponding drive. A computer-readable medium may be defined as a non-transitory memory device. A memory device may include space within a single physical memory device or spread across multiple physical memory devices.

In one example, when device 300 is a mobile device of a mobile user, input device 340 may include one or more components that permit the user to input information into device 300. For example, input device 340 may include a keypad, a button, a switch, a knob, fingerprint recognition logic, retinal scan logic, a web cam, voice recognition logic, a touchpad, an input port, a microphone, a display, or some other type of input component. Output device 350 may include one or more components that permit device 300 to output information to a user. For example, output device 350 may include a display, light-emitting diodes (LEDs), an output port, a speaker, or some other type of output component.

Communication interface 360 may include one or more components that permit device 300 to communicate with other devices or networks. For example, communication interface 360 may include some type of wireless or wired interface. Communication interface 330 may also include an antenna (or a set of antennas) that permit wireless communication, such as the transmission and reception of radio frequency (RF) and/or optical signals. The communications interface 330 may additionally or alternatively support a wired connection, for example, an Ethernet connection to a wired portion of the network. The communication interface 360 may include multiple digital transceivers, for communicating with multiple access networks.

As described herein, device 300 may perform certain operations in response to processor 320 executing software instructions contained in a computer-readable medium, such as memory 330. The software instructions may be read into memory 330 from another computer-readable medium or from another device via communication interface 360. The software instructions contained in memory 330 may cause processor 320 to perform one or more processes involved in background audio insertion as described herein. Alternatively, hardwired circuitry may be used in place of, or in combination with, software instructions to implement processes described herein. Thus, implementations described herein are not limited to any specific combination of hardware circuitry and software.

In an example, when the device in FIG. 4A is the BNI 188, communication interface 360 may connect to a conference call with UA 100 and UB 104. Communication interface 360 may receive the media stream of the phone call between the mobile devices. Background audio stored in memory 330 may be retrieved by processor 320 and inserted into the media streams through a digital mixing process. The modified media streams may then be sent to the UA 100 and the UB 104 through communication interface 360 and the applicable network(s).

Figure 4B:
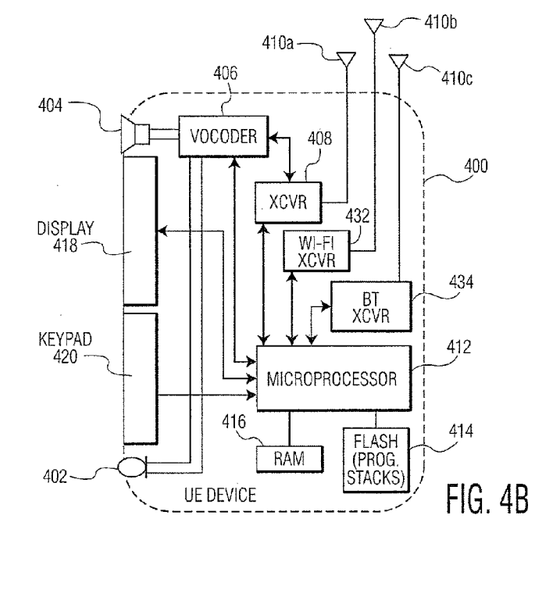
FIG. 4B shows a block diagram of an example mobile device that may be used as one of the mobile devices shown in FIG. 1.

FIG. 4B is a block diagram illustration of examples of mobile user devices 100 and 104. Although each of the user devices may be a smart-phone or may be incorporated into another device, such as a personal digital assistant (PDA) or the like, for discussion purposes, the illustration shows the user devices in the form of a handset. Each of the devices includes a call interface by which calls to other devices may be made and received, a network interface by which communications can be established with other local user devices and a short-range communications interface by which communications with short range devices, such as a cordless headset, may be established.

The handset example of the user device 400 functions as a normal digital wireless telephone station such as UA 100 and/or UA 104. For that function, the station 400 includes a microphone 402 for audio signal input and a speaker 404 for audio signal output. The microphone 402 and speaker 404 connect to voice coding and decoding circuitry (vocoder) 406. For a voice telephone call, for example, the vocoder 406 provides two-way conversion between analog audio signals representing speech or other audio and digital samples at a compressed bit rate compatible with the digital protocol of wireless telephone network communications or voice over packet (e.g., Internet Protocol) communications through the IMS core network 105. For example, the vocoder 406 digitizes audio (including the user's speech) from the microphone for communication through the IMS core network 105 for delivery to the other mobile device (and if applicable for mixing with background audio). The vocoder 406 processes received digitized audio information, including speech of the other party to a call and added background audio, to produce a corresponding audio signal that may be able to drive (possibly with amplification or other processing not shown) speaker 404 for audio signal output.

For digital communications, the handset 13a also includes at least one digital transceiver (XCVR) 408, an optional wireless network transceiver 432 and a short-range transceiver 434. For purposes of illustration, the wireless network transceiver 432 is shown as a Wi-Fi transceiver and the short-range transceiver 434 as a Bluetooth transceiver. Although not shown, the mobile station 400 may also be capable of analog operation via a legacy network technology. The device may also include a wired digital connection in addition to or in place of the digital transceiver 408. The digital transceiver 408 or wired connection is the call interface through which call data are received by the processor 412. The device 400 may not include a wireless network transceiver 432 and the transceiver 408 may be the network interface as well as the call interface. The digital transceiver (XCVR) 408, the wireless network transceiver 432 and/or the short-range transceiver 434 may be able to send and received packets of digitized information for the voice or video calls that may in turn be subject to the background audio insertion in the network.

The transceiver 408 provides two-way communication of information, such as vocoded speech samples and/or digital information, in accordance with the technology of the network environments 100 and 200. The transceiver 408 also sends and receives a variety of signaling messages in support of the various voice and data services provided via the UE device 400 and the communication network. Each transceiver 408, 432 and 434 connects through radio frequency (RF) send and receive amplifiers (not separately shown) to a respective antenna 410a, 410b and 410c. It is contemplated, however, that one or more of these antennas may be shared by multiple transceivers The transceiver 408 may also support various types of mobile messaging services, such as short message service (SMS), enhanced messaging service (EMS) and/or multimedia messaging service (MMS). It is contemplated that one or more of the antennas may be replaced by a digital wired connection.

The example mobile device 400 includes a display 418 for displaying messages, menus or the like, call related information dialed by the user, calling party numbers, etc. A keypad 420 enables dialing digits for voice and/or data calls as well as generating selection inputs, for example, as may be keyed-in by the user based on a displayed menu or as a cursor control and selection of a highlighted item on a displayed screen. The display 418 and keypad 420 are the physical elements providing a textual or graphical user interface. Various combinations of the keypad 420, display 418, microphone 402 and speaker 404 may be used as the physical input output elements of the graphical user interface (GUI), for multimedia (e.g., audio and/or video) communications. Of course other user interface elements may be used, such as a trackball or other pointing device (not shown), as in some types of PDAs or smart phones.

In addition to normal telephone and data communication related input/output (including message input and message display functions), the user interface elements also may be used for display of menus and other information to the user and user input of selections, e.g. for set-up of a default for background audio insertion or for an ON-Demand request for background audio insertion.

A microprocessor 412 serves as a programmable controller for the UE device 400, in that it controls all operations of the UE device 400 in accordance with programming that it executes, for all normal operations. In the example, the UE device 400 includes flash type program memory 414, for storage of various "software" or "firmware" program routines and mobile configuration settings, such as mobile directory number (MDN) and/or mobile identification number (MIN), etc. The UE device 400 may also include a non-volatile random access memory (RAM) 416 for a working data processing memory. Of course, other storage devices or configurations may be added to or substituted for those in the example. In a present implementation, the flash type program memory 414 stores firmware such as a boot routine, device driver software, an operating system, call processing software and vocoder control software, and any of a wide variety of other applications, such as client browser software and short message service software. The memories 414 and 416 also store various data, such as telephone numbers and server addresses, downloaded data such as multimedia content, and various data input by the user. Programming stored in the flash type program memory 414, sometimes referred to as "firmware," is loaded into and executed by the microprocessor 412. Although the microprocessor 412 and memories 414 and 416 are shown as being internal to the UE device 400, it is contemplated that it may be external to the device as may the transceivers 432 and 434.

The processor, and thus the mobile device, may be configured for voice or video call set-up and associated background audio user interface functions, by appropriate programming executable by the processor. The relevant programming may be native programming, e.g. as part of or closely associated with the operating system. Alternatively, these functions may be implemented via a separate application program.

In one example, UA 100 and UB 104 may be implemented as the mobile device in FIG. 4B. In this example, the XCVR of each wireless device would wirelessly communicate through an access network. This communication would be sent to the IMS core network through the respective PGW. The media stream received back through the XCVR from the IMS core network will include the voices of the parties involved, mixed with the background audio from the BNI. The user of the mobile device will be able to use the keypad and display to interact with an application for accessing the BNI services. For example, the mobile users may select specific background audio to be inserted in the phone call. This request will be sent by the mobile device back to the BNI using XCVR 408.

FIG. 5 shows a background noise file which may be stored on BNI 118 for managing the insertion or transmission of background audio requested by calling party UA 100. For example, the credentials, noise selections and automatic noise preferences of UA 100 may be stored in the background noise file. Each authorized user may have their own background noise file which may be accessible by BNI 118 for determining whether to insert or transmit the background audio requested by the calling device.

For example, the background noise file may include credentials such as identification of UA 100 and service plan information of UA 100. These credentials may initially be analyzed by BNI 118 upon receiving the SIP invite message from UA 100 when establishing the connection. BNI 118 may determine if UA 100 is an authorized user of the BNI services based on their identification and service plan information (i.e., whether the user of UA 100 has paid to have this additional service provided by their service provider). Once the user of UA 100 has been authorized to utilize BNI services, BNI may determine based on automatic noise preferences whether UA 100 has preselected a default background audio to be inserted into the phone/video call. For example, the default preferences may include particular audio/noises that are played automatically for every phone call, based on location of the calling party, based on the identity of the called party or based on time of day. Essentially, the various background audios may be selected based on any preference defined by UA 100.

In one example the preferences may indicate that specific audio should be played when the mobile phone is located in a business setting (e.g. an office building). In this example, the mobile phone may compute its location using Global Positioning System (GPS) and/or dead reckoning capabilities. This location information could be transmitted over the network to the BNI when the mobile phone enters a certain location, or transmitted periodically to the BNI. The BNI could use this location information to choose the appropriate background noise to insert into the phone call (i.e. the BNI would search through the background noise file preferences for the audio that corresponds to the location information received from the mobile device).

In another example, the preferences may indicate that any call made during normal business hours have sounds of an office building or relaxed music playing in the background. This may be useful if the worker is not actually in the office at the time of the call. Other audio/noise (e.g. other music) may be played after normal business hours. In any case, the preferences (e.g. types of audio/noise and when/how they are triggered) are selected by the user of UA 100.

In an example where the call has already been established between UA 100 and UB 104, the UA 100 may select a background audio On-Demand. A HTTP post message may be received by BNI 118. BNI 118 may then look at the background audio/noise selections that are possible for the HTTP post message. The background audio/noise selection within the HTTP post message may then be compared to the noise selection in the background noise file to determine if there is a match. If there is a match, then the background audio is sent to the MRF to be inserted into the media path between a phone/video call of UA 100 and UB 104 (i.e. the MRF retrieves the audio and inserts the audio into the phone call as background audio).

FIG. 5 is just one example of a possible background noise file. It is contemplated that other relevant information may also be included in the background noise file. It is also contemplated that UA 100 may be able to modify the file. It is also contemplated that the management server shown in FIG. 3 may also be able to modify, delete or add new background noise files for various users. For example, the management server may delete a background noise file for a user that has not paid the bill for the BNI services. In another example, the management server may generate a new background noise file for a new user that has just signed up for the BNI services.

Figure 6:
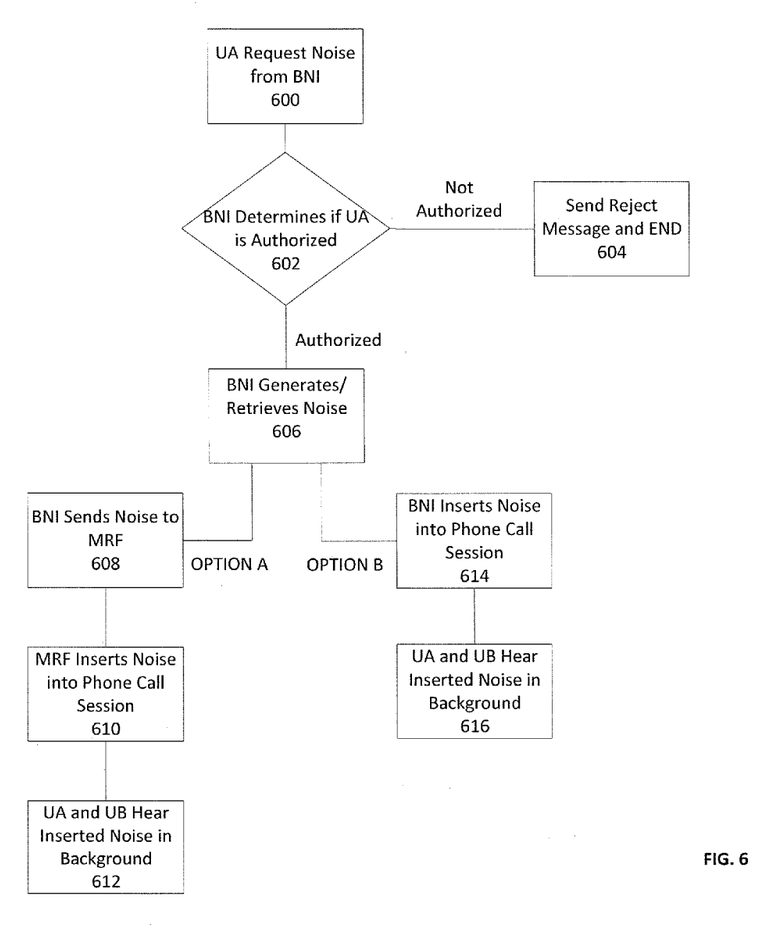
FIG. 6 shows a flow chart of the calling party connecting to the BNI and conducting a phone call with inserted background audio.

FIG. 6 is a high level flow diagram of how the overall BNI system operates with default audio being inserted by the BNI, and ON-Demand audio being inserted by the MRF. In step 600, for example, the UA requests background audio from BNI 118. In step 602, the BNI determines if the user device is authorized based on identification information of UA. If UA is not authorized, the BNI may simply not connect to the phone call between UA and UB, and may send a reject message back to the UA 100. If UA 100 is an authorized device, then in step 606, the BNI generates or retrieves the background audio that may be as a default in the background noise file.

In option B, this default audio is inserted in step 614 into the phone/video call by the BNI. This allows both UA 100 and UB 104 to hear the inserted background noise in step 616. In contrast, in an ON-Demand request for a particular background audio, the BNI will still generate or retrieve the background audio from memory in step 606. However, in Option A, since the call has already been established, the BNI sends this background audio to the MRF in step 608. The MRF then inserts this background audio into the phone/video call in step 610 where both UA 100 and UB 104 will hear the inserted background audio in step 612. In either case, both UA 100 and UB 104 receive the background audio in the phone/video call. It is also possible for the BNI to insert default audio, and then the user will override this default audio by selecting new audio to be inserted by the MRF.

The examples described above utilize various mobile devices and computers configured as servers or other network connected components. A discussion of examples of these devices and how they may operate is described below.

A server computer, for example, may include a data communication interface for packet data communication. The server computer also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs. A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

In a computer configured as a server or user terminal and in a mobile device, a processor is a circuit having elements structured and arranged to perform one or more processing functions, typically various data processing functions. Although discrete logic components could be used, the examples utilize components forming a programmable central processing unit (CPU). A microprocessor for example, includes one or more integrated circuit (IC) chips incorporating the electronic elements to perform the functions of the CPU.

Hence, aspects of the methods of inserting the background audio into the phone/video call may be embodied in programming. Program aspects of the technology may be thought of as "products" or "articles of manufacture" typically in the form of executable code and/or associated data that is carried on or embodied in a type of machine readable medium. Executable code, for example, may take the form of software, firmware, microcode, or the like of the type suitable for execution by the particular processor hardware of the mobile device, other user terminal device or server platform, so as to configure the respective equipment to perform functions like those discussed herein.

"Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platforms of the highlighters and the in store processing system. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile devices, highlighters, servers, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A background noise inserter (BNI) server, including:
a communication interface configured to communicate via a network;
a memory that stores background audio to be inserted into a phone call session between a calling device and a called device; and
a processor, coupled to the communication interface and the memory, to:
connect to the phone call session based on a session initiation protocol (SIP) invite from the calling device, and
insert a default background audio into a beginning of the phone call session,
the default background audio being pre-selected based on a location of the calling device, and
the background audio being mixed with audio from the phone call session and transmitted, through the network, to the calling device and the called device.

2. The BNI server of claim 1, wherein the processor, when connecting to the phone call session, is to:
connect to the phone call session prior to the calling device connecting to the called device.

3. The BNI server of claim 1, wherein the processor, when connecting to the phone call session, is to:
connect to the phone call session prior to the calling device connecting to the called device, and
wherein the processor is further to:
transmit additional background audio to a processor of a media resource function (MRF) during the phone call session based on the called device requesting the additional background audio during the phone call session.

4. The BNI server of claim 3, wherein the processor is further to:
transmit instructions to the MRF instructing the MRF to insert the additional background audio into a voice call session or a video call session.

5. The BNI server of claim 1, wherein the processor, when inserting the default background audio into the beginning of the phone call session, is to:
insert the default background audio into the beginning of the phone call session based on receiving the SIP invite from the calling device and determining that the calling device has selected the default background audio.

6. The BNI server of claim 1, wherein the processor, when inserting the default background audio into the beginning of the phone call session, is to:
insert the default background audio into the beginning of the phone call session based on based on receiving the SIP invite from the calling device and based on audio preferences being pre-stored in the memory of the BNI.

7. The BNI server of claim 1, wherein the processor is further to:
receive identification information from the calling device, and
check to determine whether the calling device is authorized to receive the default background audio.

8. A media resource function (MRF) server, including:
a communication interface configured to communicate via a network;
memory for storing background audio to be inserted into a phone call session between a calling device and a called device; and
a processor, coupled to the communication interface and the memory, to:
receive a request from a background noise inserter (BNI) server indicating that the calling device is requesting a default background audio during a phone call session between the calling device and the called device,
retrieve the default background audio from the BNI server,
the default background audio being pre-selected based on a location of the calling device, and
insert the default background audio into the phone call session so that the default background audio is mixed with audio from the phone call session transmitted to the calling device and the called device.

9. The MRF server of claim 8, wherein the processor is further to:
connect to the phone call session after the calling device is connected to the called device, and
insert the default background audio after a beginning of the phone call session.

10. The MRF server of claim 8, wherein the processor, when receiving the request from the BNI server, is to:
receive the request for the background audio from the BNI server after the request was sent from the calling device to the BNI server.

11. The MRF server of claim 8, wherein the processor, when inserting the default background audio into the phone call session, is to:
insert the default background audio into the phone call session based on determining that the calling device has selected the default background audio from a list during the phone call session.

12. The MRF server of claim 8, wherein the processor, when retrieving the default background audio from the BNI server, is to:
retrieve the default background audio from the BNI server based on audio preferences pre-stored in the BNI server for the calling device.

13. The MRF server of claim 8, wherein the processor, when retrieving the default background audio from the BNI server, is to:
retrieve the default background audio from the BNI server based on identification information from the calling device being authorized by the BNI server.

14. The MRF server of claim 8, wherein the processor, when receiving the request from the BNI server, is to:
- receive the request for the default background audio as an HTTP Post message from the BNI server, and
- wherein the processor, when retrieving the default background audio from the BNI server, is to:
  - retrieve the default background audio using an HTTP Get message to the BNI server.

15. A method, including:
- receiving, by a processor of a calling device, an input from a user of the calling device indicating that background audio is to be inserted into a phone call session between the calling device and a called device;
- sending, by a transceiver of the calling device, a session initiation protocol (SIP) invite to a background noise inserter (BNI) processor based on receiving the input from the user; and
- receiving, from the BNI processor and by the transceiver of the calling device, at a beginning of the phone call session, the background audio mixed with audio from the phone call session,
  - the background audio being a default background audio,
- the default background audio being pre-selected based on a location of the calling device.

16. The method of claim 15, further comprising:
- displaying, by a display of the calling device, a graphical user interface (GUI) showing background audio selections to be selected by the user of the calling device.

17. The method of claim 15, wherein the input is a first input and the background audio is a first background audio; and
wherein the method further comprises:
- receiving, by a touchscreen of the calling device, a second input from the user during the phone call session; and
- sending, by the transceiver of the calling device, a request to the BNI processor to insert second background audio during the phone call session based on receiving the second input from the user during the phone call session.

18. The method of claim 15, further comprising:
- sending, by the transceiver of the calling device, preferences of the user of the calling device,
  - the preferences indicating selections of background audio to be inserted into the phone call session automatically.

19. The method of claim 15, further comprising:
- sending, by the transceiver of the calling device, identification information and service plan information; and
- receiving, by the transceiver of the calling device, authorization to interact with the BNI processor.

20. The method of claim 15, further comprising:
- sending, by the transceiver of the calling device, the location of the calling device to the BNI processor; and
- receiving, by the transceiver of the calling device, background audio selected by the BNI processor based on the location of the calling device.

\* \* \* \* \*